United States Patent
Huang et al.

(10) Patent No.: US 10,688,929 B2
(45) Date of Patent: Jun. 23, 2020

(54) DRIVING ASSISTANCE SYSTEM AND METHOD OF ENHANCING A DRIVER'S VISION

(71) Applicants: Shanghai XPT Technology Limited, Shanghai (CN); INTELLIGENCE & PARTNER LIMITED, Hong Kong (HK)

(72) Inventors: Mu-Jen Huang, Taipei (TW); Ya-Li Tai, Taoyuan (TW); Yu-Sian Jiang, Kaohsiung (TW)

(73) Assignees: Shanghai XPT Technology Limited, Shanghai (CN); Mindtronic AI Co., Ltd., Grand Cayman (KY)

( * ) Notice: Subject to any disclaimer, the term of this patent is extended or adjusted under 35 U.S.C. 154(b) by 0 days.

(21) Appl. No.: 15/989,208

(22) Filed: May 25, 2018

(65) Prior Publication Data
US 2018/0370434 A1 Dec. 27, 2018

Related U.S. Application Data

(63) Continuation-in-part of application No. 15/908,686, filed on Feb. 28, 2018.

(30) Foreign Application Priority Data

Jun. 27, 2017 (CN) .......................... 2017 1 0502231
Jun. 27, 2017 (CN) ..................... 2017 2 0756894 U

(51) Int. Cl.
*B60R 1/00* (2006.01)

(52) U.S. Cl.
CPC .......... *B60R 1/00* (2013.01); *B60R 2300/106* (2013.01); *B60R 2300/301* (2013.01); *B60R 2300/304* (2013.01); *B60R 2300/70* (2013.01)

(58) Field of Classification Search
CPC ................ B60R 1/00; B60R 2300/106; B60R 2300/301; B60R 2300/304; B60R 2300/70
See application file for complete search history.

(56) References Cited

U.S. PATENT DOCUMENTS

| | | | |
|---|---|---|---|
| 6,254,259 B1 | 7/2001 | Kobayashi | |
| 6,521,892 B2 | 2/2003 | Emanuel | |
| 6,831,261 B2 | 12/2004 | Schofield | |
| 8,600,656 B2 | 12/2013 | Mimeault | |
| 2003/0095080 A1* | 5/2003 | Colmenarez | G06K 9/00791 345/7 |
| 2003/0122930 A1 | 7/2003 | Schofield | |
| 2004/0257442 A1 | 12/2004 | Eggers | |
| 2005/0072921 A1 | 4/2005 | Moisel | |
| 2005/0110621 A1 | 5/2005 | Hahn | |
| 2006/0291849 A1 | 12/2006 | Shamir | |

(Continued)

Primary Examiner — Nam D Pham
(74) Attorney, Agent, or Firm — Winston Hsu

(57) ABSTRACT

A driving assistance system includes a first camera disposed in the vehicle and configured to capture a visible image; a second camera disposed in the vehicle and configured to capture an invisible image; a display device configured to display images to the driver; and a processor coupled to the first camera, the second camera, and the display device, the processor conducts a process of image fusion to combine the visible image and the invisible image to obtain a fused image; wherein the display device displays the fused image only when the clarity of the visible image falls below a preset threshold.

19 Claims, 8 Drawing Sheets

(56) References Cited

U.S. PATENT DOCUMENTS

| | | | |
|---|---|---|---|
| 2010/0309315 A1* | 12/2010 | Hogasten | H04N 5/33 |
| | | | 348/164 |
| 2011/0074955 A1 | 3/2011 | Kuehnle | |
| 2014/0198213 A1 | 7/2014 | Liken | |
| 2015/0145996 A1* | 5/2015 | Watanabe | G08G 1/09626 |
| | | | 348/148 |
| 2016/0223588 A1* | 8/2016 | Fox | G01J 5/0896 |
| 2016/0232423 A1* | 8/2016 | Zhong | G06K 9/52 |

* cited by examiner

DRIVING ASSISTANCE SYSTEM AND METHOD OF ENHANCING A DRIVER'S VISION

CROSS REFERENCE TO RELATED APPLICATIONS

This application is a continuation-in-part application of Ser. No. 15/908,686.

BACKGROUND OF THE INVENTION

1. Field of the Invention

The present invention relates to a driving assistance method and a method of enhancing a driver's vision, and more particularly, to a driving assistance method and a method of enhancing a driver's vision which is capable of presenting relevant and enhanced information to the driver when the circumstance so requires.

2. Description of the Prior Art

Modern vehicles are equipped with numbers of sensors and cameras to collect surrounding data and provide additional information to assist the drivers. The downside, however, is too much information without scrutiny could be annoying and distract the drivers. The present invention provides a driving assistance system that presents relevant and enhanced information to the driver in a subject vehicle only when the circumstance so requires.

SUMMARY OF THE INVENTION

The present invention provides a driving assistance system in a vehicle for assisting a driver. The system includes: a first camera disposed in the vehicle and configured to capture a visible image; a second camera disposed in the vehicle and configured to capture an invisible image; a display device configured to display images to the driver; and a processor coupled to the first camera, the second camera, and the display device, the processor conducts a process of image fusion to combine the visible image and the invisible image to obtain a fused image; wherein the display device displays the fused image only when the clarity of the visible image falls below a preset threshold.

The present invention further provides a method of enhancing a driver's vision from a vehicle. The method includes: obtaining a visible image; obtaining an invisible image; conducting a process of image fusion to combine the visible image and the invisible image to obtain a fused image; and displaying the fused image to the driver to enhance the driver's vision if the clarity of the visible image falls below a threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
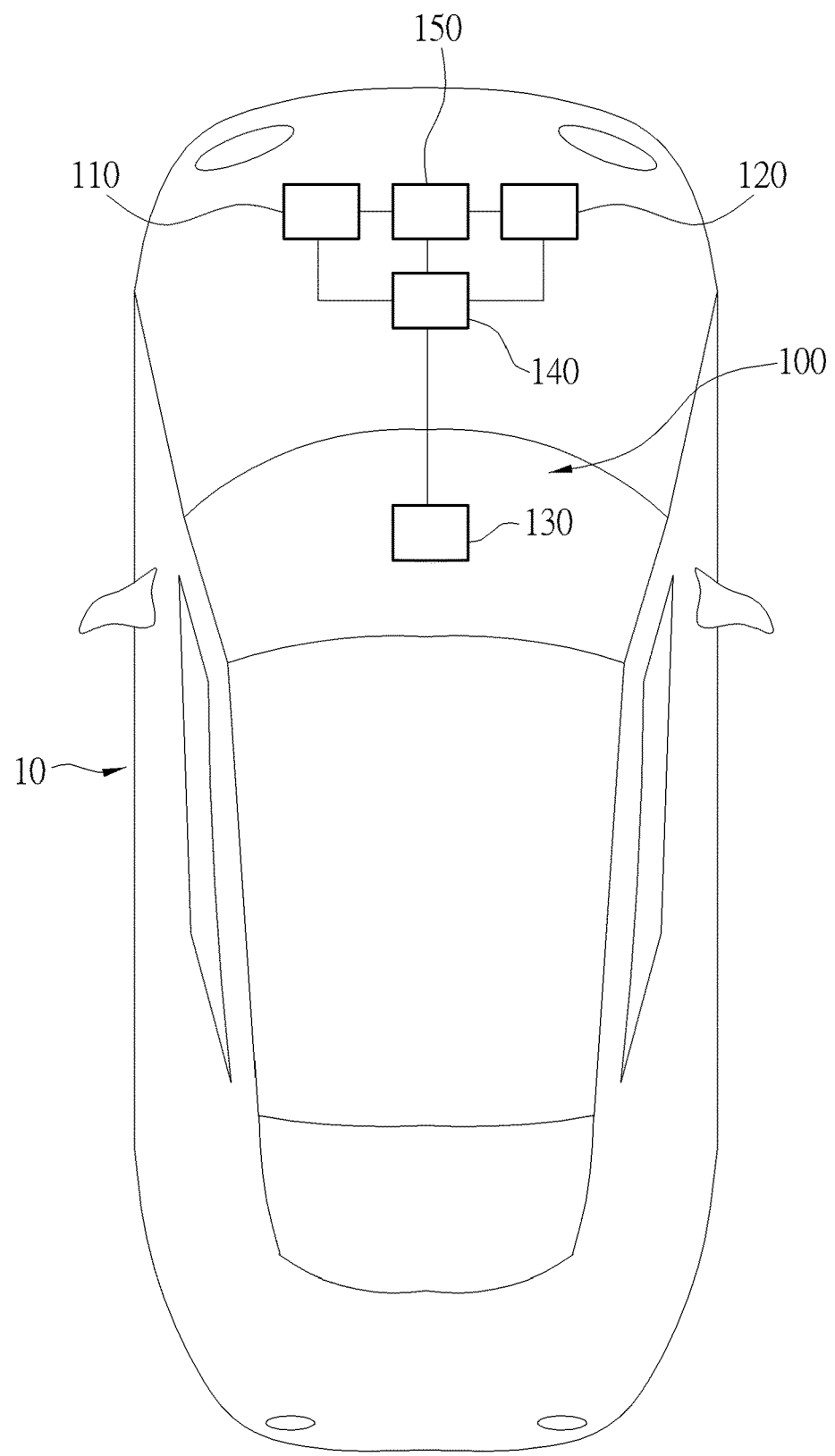
FIG. 1 is a schematic diagram of a driving assistance system according to an embodiment of the present invention.
Figure 4:
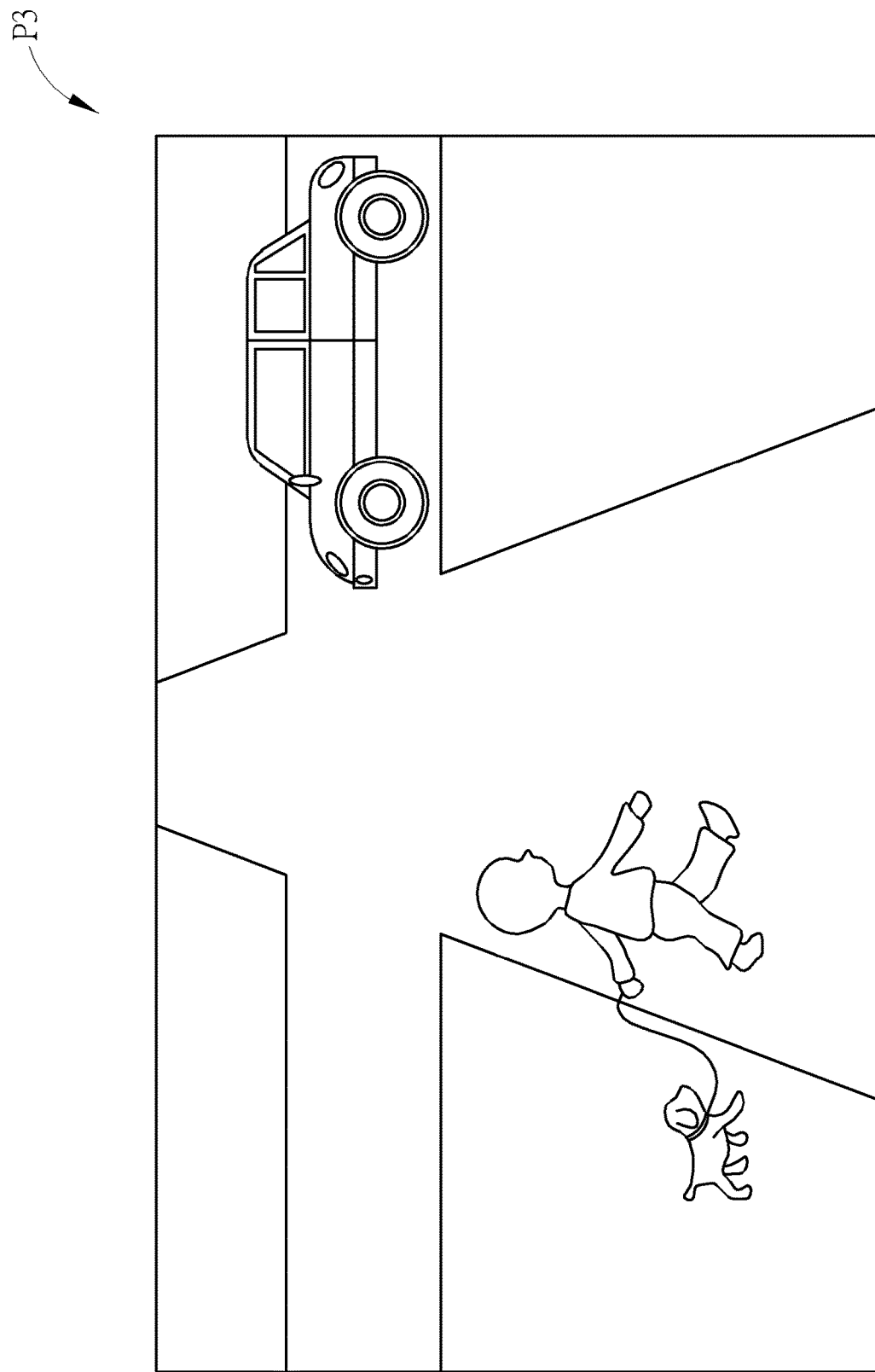
FIG. 4 is a schematic diagram of a visible image P3 captured by the first camera shown in FIG. 1.
Figure 5:
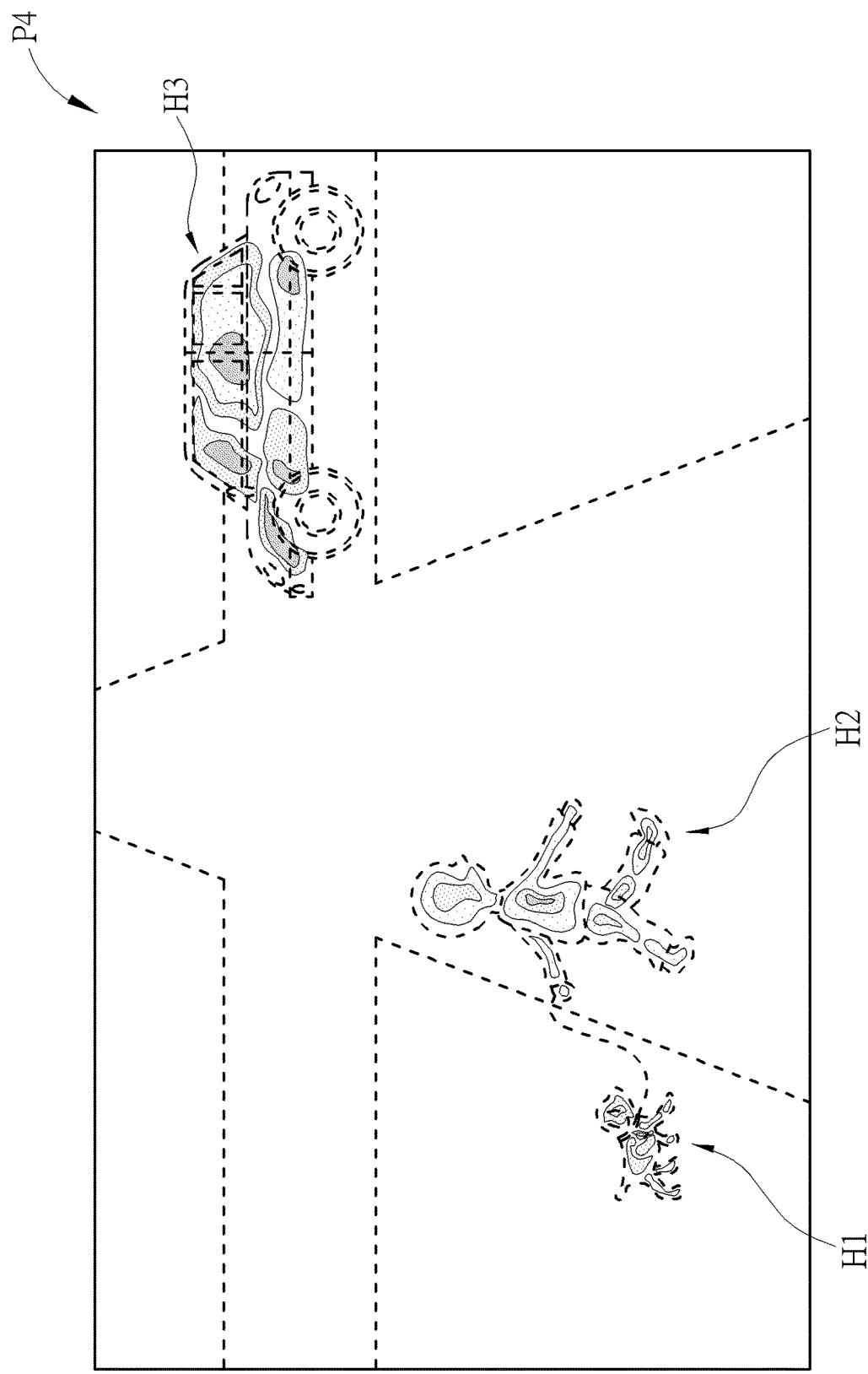
FIG. 5 is the schematic diagram of an invisible image P4 captured by the second camera shown in FIG. 1.
Figure 6:
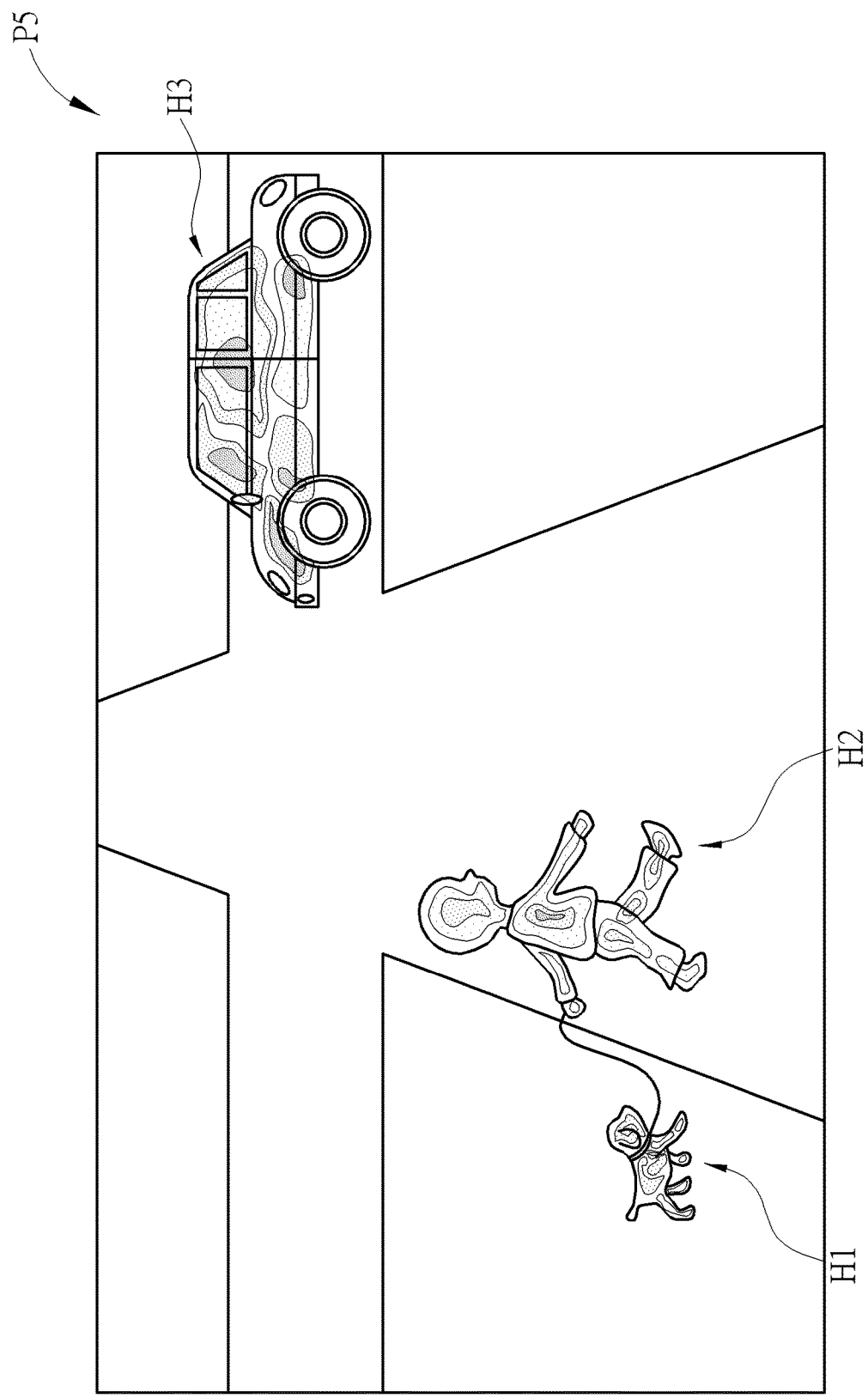
FIG. 6 is the schematic diagram of the fused image P5 combining the visible and the invisible images P3 and P4 generated by the processor shown in FIG. 1.
Figure 8:
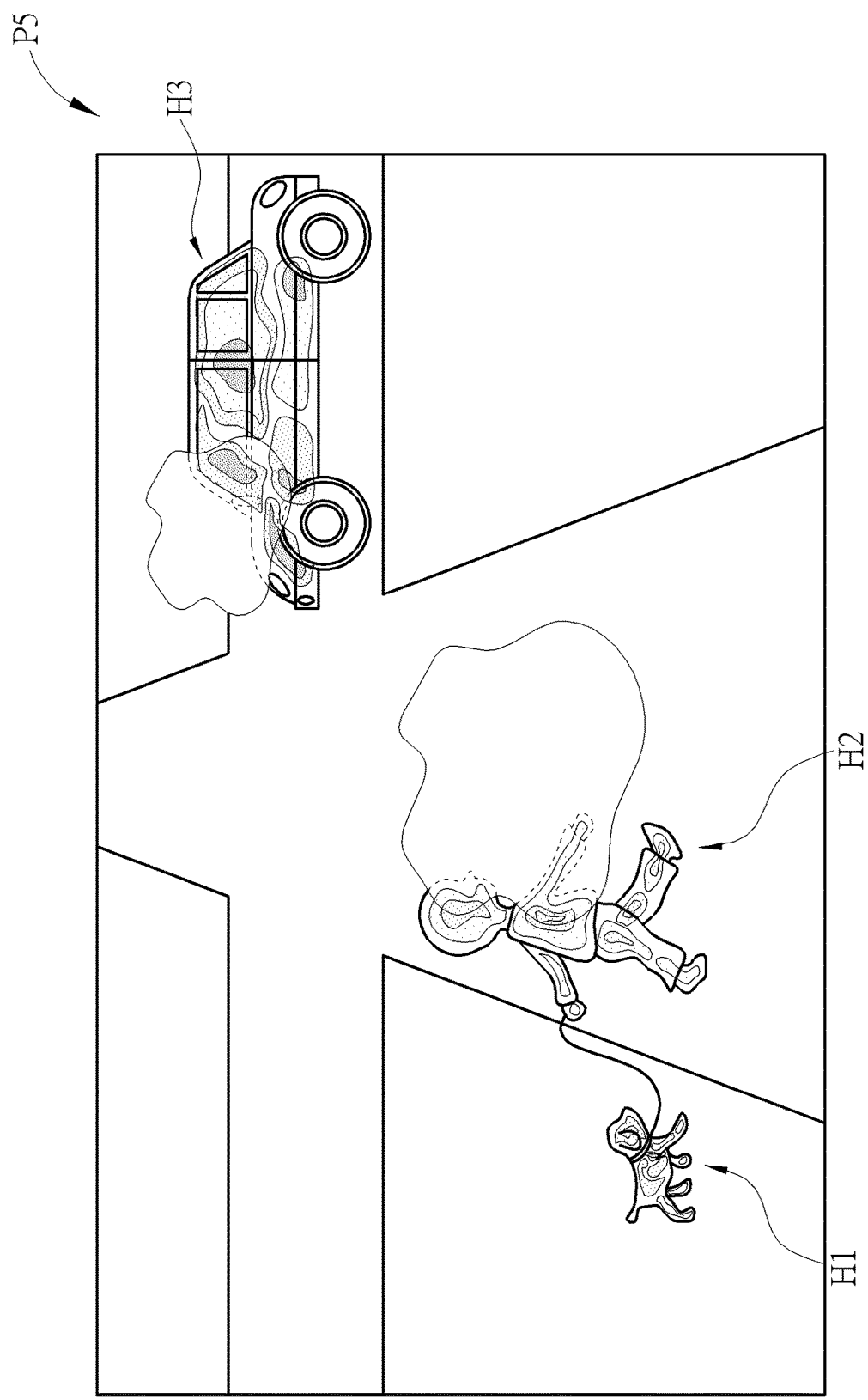
FIG. 8 is a schematic diagram of the fused image P5 combining the visible and invisible images generated by the processor shown in FIG. 1 under a misty weather condition.

As shown in FIG. 1, the driving assistance system 100 according to the present invention includes at least two cameras 110 and 120, configured to capture visible images (as shown in FIG. 4) visible to human eyes and thermal images (as shown in FIG. 5) invisible to human eyes respectively. Additionally, the driving assistance system 100 further includes several sensors disposed in the subject vehicle 10 to collect data surrounding it (not shown in FIG. 1); and a processor 140 configured to process the visible images, the thermal images, and the collected data. In the present invention, the processor 140 conducts a process of image fusion to combine the visible images and the thermal images to obtain the fused images (as shown in FIGS. 6 and 8). Moreover, the driving assistance system 100 of the present invention further includes a display device 130 configured to conditionally display the fused images to the driver.

In one embodiment of the present invention, the visible images captured by the camera 110 serve to mimic the driver's vision from the subject vehicle 10. The degree of clarity for the visible images is used to determine whether the driver's ability to see things is or will be compromised given the current driving condition. In the present invention, several criteria and thresholds are preset to determine whether the clarity of the visible images falls below, and if so, the system 100 will then assume that the driver in the subject vehicle 10 may be unable to see things surrounding him/her clearly. Only when the conclusion is met that the display device 130 presents the fused images to the driver. Additionally, the thermal images may be captured by a thermal imaging camera or an infrared camera.

If, on the other hand, the clarity of the visible images does not fall below the threshold, the system 100 of the present invention may figure that the driver's vision is not affected. Thus, there will be no need to display the fused images to assist the driver. In this way, the driver is less distracted and can focus on driving.

FIG. 8 illustrates a circumstance where the visibility of the objects surrounding the subject vehicle 10 is partially compromised because of the misty weather. As shown, the unaffected part is in solid line while the affected part is in dot line. If the driving assistance system 100 of the present invention determines that the user may not be able to see those surrounding objects, it presents the fused image P5 where the thermal image is fused with the partially clear visible image to assist the user.

Figure 2:
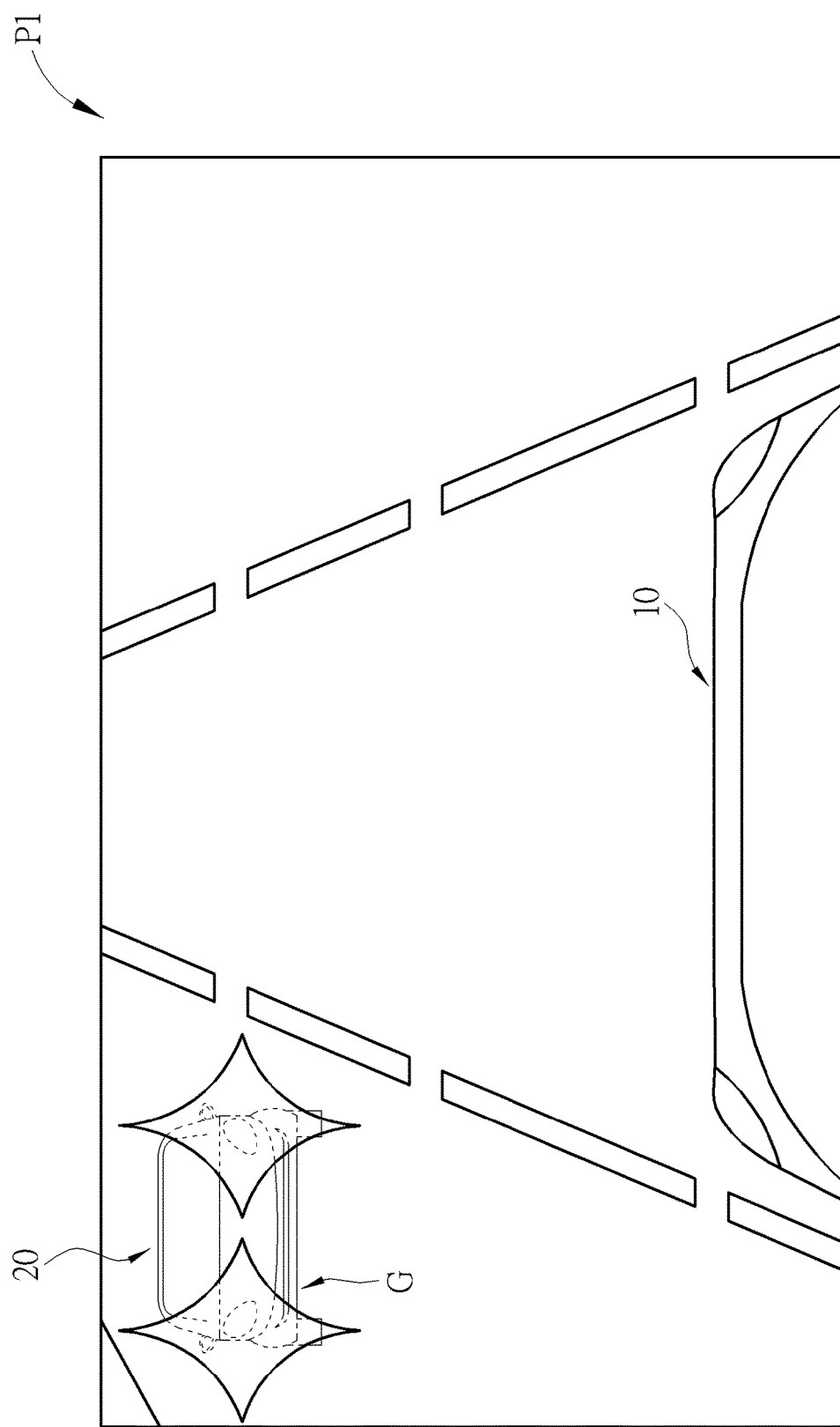
FIG. 2 is a schematic diagram of determining the driving condition by the driving assistance system according to one embodiment of the present invention.
Figure 3:
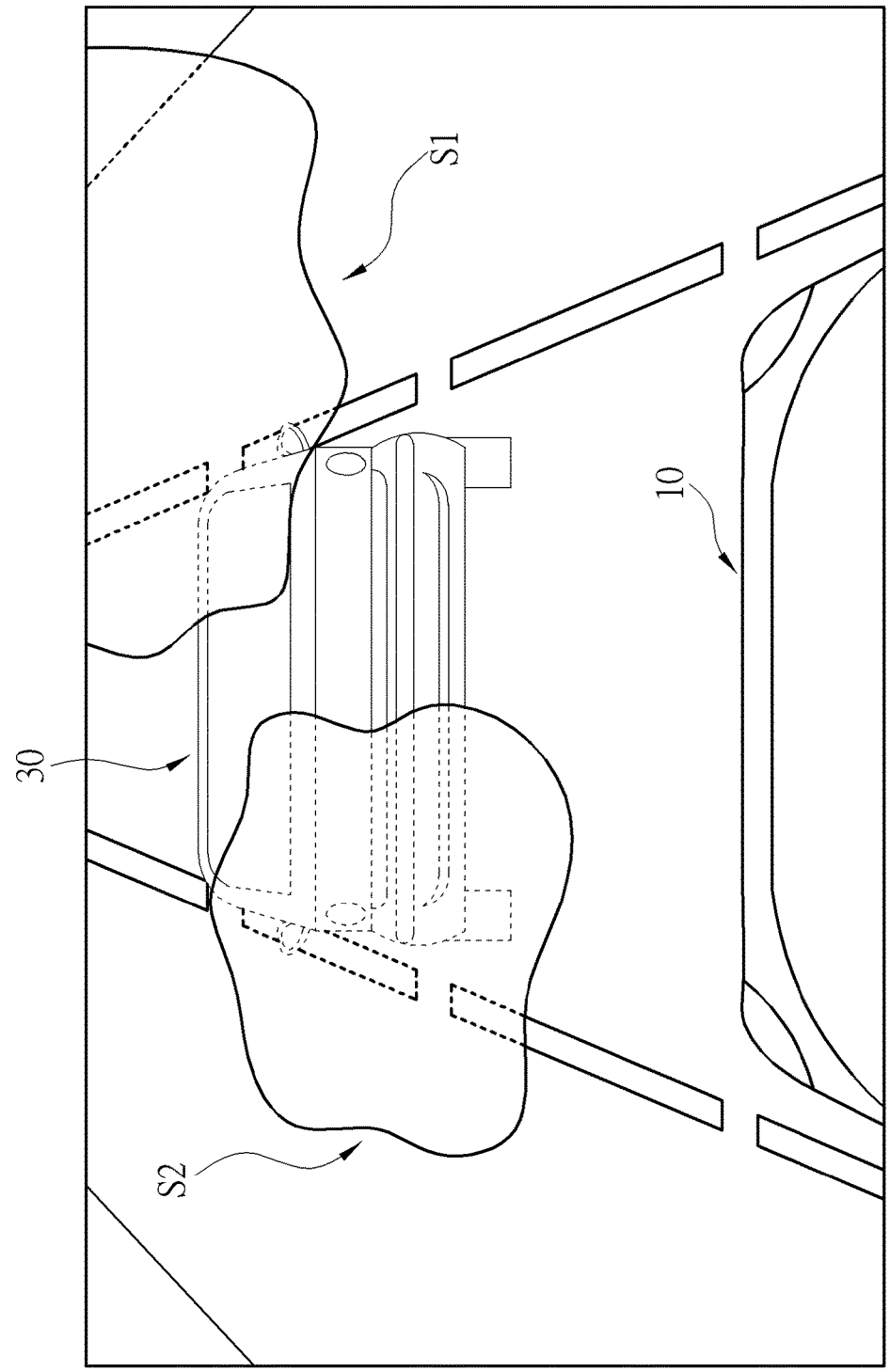
FIG. 3 is a schematic diagram of determining the driving condition by the driving assistance system according to another embodiment the present invention.

As previously discussed in the parent application, there are many ways to determine if the clarity of the visible images is undesirable. FIG. 2 depicts a scenario where the vision of the driver from the subject vehicle 10 may be negatively affected because of another vehicle's rear light; while FIG. 3 shows another scenario where the driver's vision is compromised because of a foggy weather. The determination can be made, for instance, by reference to the size (or the size ratio) of glaring or foggy areas spotted on the visible images, the pixel amounts of the glaring or foggy areas, or the intensities of the ambient light between the critical area and its neighboring area. If either of the criteria is satisfied, the system 100 of the present invention assumes that the driver's vision from the subject vehicle 10 is or will be compromised because of the driving condition. Consequently, only under such circumstance, the display device 130 of the present invention displays the fused images to the driver.

It should be noted that the system. 100 of the present invention does not entirely rely on the clarity of the visible images for the determination of the degree of visibility; rather the system 100 may depend on the data collected by the sensors. For instance, the temperature and humidity sensor(s) may collect temperature and humidity degrees and, based on the data, the system of the present invention may predict whether or not the weather is hazy that the driver's ability to see is or will be affected. Alternatively, the system 100 of the present invention may also include a particulate matter (PM) sensor to detect PM concentrations. If the value reaches a certain threshold, the system 100 of the present invention concludes the weather is smoggy and the driver's vision is therefore restricted. As previously mentioned, only when it is concluded that the driver's vision from the subject vehicle 10 is or will compromised that the display device 130 of the system 100 displays the fused images to provide information and precaution to the driver. One skilled in the art should understand that other than displaying the fused images on the display device 130, the display device 130 may also display the relevant environmental data collected by the sensor to inform the driver.

In another embodiment of the present invention, the driving assistance system 100 may further include a lidar or a radar sensor in addition to the two cameras 110 and 120 discussed above to collect information, say detected object images, not otherwise available from both visible and thermal images. Similarly, the processor 140 of the present invention conducts a process of image fusion to combine the visible images, the thermal images, and the detected object images to obtain the fused images. The display device 130 of the present invention displays the fused images to the driver only when it is determined that the driver's vision from the vehicle is or will be compromised given the current driving condition.

Figure 7:
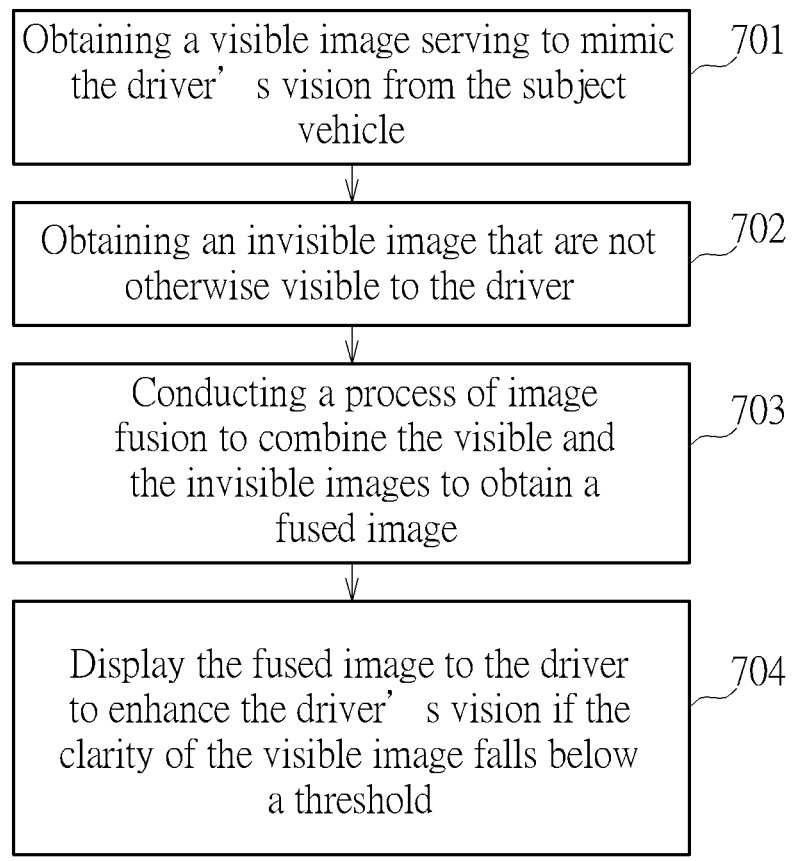
FIG. 7 illustrates a process of a driving assistance method according to an embodiment of the present invention.

The present invention also provides a method of enhancing driver's vision from a subject vehicle 10. The steps are illustrated in FIG. 7. As shown, the method includes: obtaining a visible image serving to mimic the driver's vision from the subject vehicle 10 (Step 701); obtaining an invisible image that are not otherwise visible to the driver (Step 702); conducting a process of image fusion to combine the visible and the invisible images to obtain a fused image (Step 703); and display the fused image to the driver to enhance the driver's vision if the clarity of the visible image falls below a threshold (Step 704). As mentioned previously, the invisible image may be a thermal image captured by a thermal camera.

In another embodiment of the present invention, the method may further include obtaining a detected object images from a lidar or a radar (not shown in FIG. 7). A process of image fusion is conducted against the visible image, the invisible image and the detected object image to obtain a fused image. The fused image is displayed to enhance the driver's vision from the subject vehicle 10 only when the clarity of the visible image falls below a threshold.

Further, the method may also include collecting various environmental data by numbers of sensors (not shown in FIG. 7). The collected environmental data may be processed and presented to the driver together with the fused image when the above discussed condition is met.

In terms of the determination of the clarity of visible image, the methods are identical to what have been discussed above and will be skipped here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving assistance system in a vehicle for assisting a driver, comprising:
   a first camera disposed in the vehicle and configured to capture a visible image;
   a second camera disposed in the vehicle and configured to capture an invisible image;
   a display device configured to display images to the driver;
   a plurality of sensors disposed in the vehicle and configured to collect environmental data surrounding the vehicle; and
   a processor coupled to the first camera, the second camera, and the display device, the processor is configured to determine a weather condition based on the environmental data, determine whether a clarity of the visible image falls below a preset threshold, determine that a driver's vision is affected when the weather condition is determined as misty or foggy, hazy or smoggy, and conduct a process of image fusion to combine the visible image and the invisible image to obtain a fused image;
   wherein the display device displays the fused image when the clarity of the visible image falls below the preset threshold, and displays the fused image when the driver's vision is determined to be affected.

2. The system of claim 1, wherein the visible image mimics the driver's vision from the vehicle.

3. The system of claim 1, wherein the invisible image is a thermal image, while the second camera is a thermal imaging camera or an infrared camera.

4. The system of claim 1, wherein one of the plurality of sensors is configured to detect one or more objects, one of the plurality of sensors is a lidar or a radar, and the processor is further configured to generate an object image based on the detected objects.

5. The system of claim 4, wherein the processor conducts the process of image fusion to combine the visible image, the invisible image and the object image to obtain the fused image.

6. The system of claim 1, wherein the determination of the clarity of the visible image is made by reference to either a size, a size ratio or a pixel amount of glaring or foggy areas identified on the visible images, or intensities of an ambient light between a critical area and its neighboring area.

7. The system of claim 1, wherein two of the sensors include a temperature and humidity sensor configured to collect temperature and humidity degrees, and the processor is further configured to:
- determine whether the weather condition is misty or foggy based on the temperature and humidity degrees; and
- determine that the driver's vision is affected when the weather condition is determined as misty or foggy.

8. The system of claim 1, wherein the display device is configured to display the environmental data together with the fused image to the driver of the vehicle.

9. The system of claim 1, wherein the plurality of sensors include a particulate matter (PM) sensor configured to collect PM concentration, and the processor is further configured to:
- determine whether the weather condition is hazy or smoggy based on the PM concentration, and
- determine that the driver's vision is affected when the weather condition is determined as hazy or smoggy.

10. A method of enhancing a driver's vision from a vehicle, comprising:
- obtaining a visible image;
- obtaining an invisible image;
- determining a weather condition based on environmental data;
- determining whether a clarity of the visible image falls below a preset threshold;
- determining that the driver's vision is affected when the weather condition is determined as misty or foggy, hazy or smoggy;
- conducting a process of image fusion to combine the visible image and the invisible image and obtain a fused image;
- displaying the fused image to the driver to enhance the driver's vision if the clarity of the visible image falls below the preset threshold; and
- displaying the fused image when the driver's vision is determined to be affected.

11. The method of claim 10, wherein the step of determining the clarity of the visible image may comprise: comparing either a size, a size ratio, or a pixel amount of glaring for foggy areas identified on the visible images, or intensities of an ambient light between a critical area and its neighboring area.

12. The method of claim 10, wherein the invisible image is a thermal image obtained from a thermal imaging camera, or an infrared camera.

13. The method of claim 10, further comprising detecting one or more objects by a lidar or a radar, and generating an object image based on the detected objects.

14. The method of claim 13, further comprising conducting the process of image fusion to combine the visible image, the invisible image and the detected object image to obtain the fused image.

15. The method of claim 10, further comprising collecting the environmental data surrounding the vehicle, wherein the method further comprises determining whether to display the fused image by reference to the collected environmental data.

16. The method of claim 15, the collected environmental data may include a temperature degree, a humidity degree, and a particulate matter (PM) concentration.

17. The method of claim 15, further comprising displaying the collected environmental data together with the fused image to the driver.

18. The method of claim 10, wherein the visible image serves to mimic the driver's vision from the vehicle.

19. The method of claim 10, further comprising:
- determining whether the weather condition is hazy or smoggy based on the PM concentration, and
- determining that the driver's vision is affected when the weather condition is determined as hazy or smoggy.

* * * * *